United States Patent

Musser

[15] 3,678,660

[45] July 25, 1972

[54] UNLOAD, CHECK, AND BAG APPARATUS FOR SUPERMARKETS

[72] Inventor: Malcolm E. Musser, P.O. Box 386, Jackson Center, Ohio 45334

[22] Filed: June 29, 1970

[21] Appl. No.: 50,467

[52] U.S. Cl. .................................................53/255, 53/391
[51] Int. Cl. .....................................B65b 39/00, B65b 67/04
[58] Field of Search...................53/187, 188, 189, 202, 255, 53/257, 259, 261, 384, 385, 386, 390, 391; 186/1 A, 1 AC

[56] References Cited

UNITED STATES PATENTS

| | | | |
|---|---|---|---|
| 2,336,213 | 12/1943 | Bayer et al............................ | 53/189 X |
| 3,512,336 | 5/1970 | Rosecrans............................. | 53/244 X |
| 2,902,811 | 9/1959 | Joyce..................................... | 53/390 X |
| 3,513,617 | 5/1970 | Greenfield............................. | 53/391 X |
| 3,564,814 | 2/1971 | Graveley............................... | 53/391 X |

*Primary Examiner*—Robert L. Spruill
*Attorney*—Jacox & Meckstroth

[57] ABSTRACT

Apparatus for checking out articles of merchandise in a supermarket type of operation. A checkout counter includes mechanism for unloading a basket-cart. The checkout counter also includes a conveyor belt having a plurality of sections. The checkout clerk moves each article checked to one of the sections of the conveyor belt. The conveyor belt moves the articles to a discharge position, at which the articles fall into one or more bags or sacks.

12 Claims, 15 Drawing Figures

Patented July 25, 1972
3,678,660
3 Sheets-Sheet 1
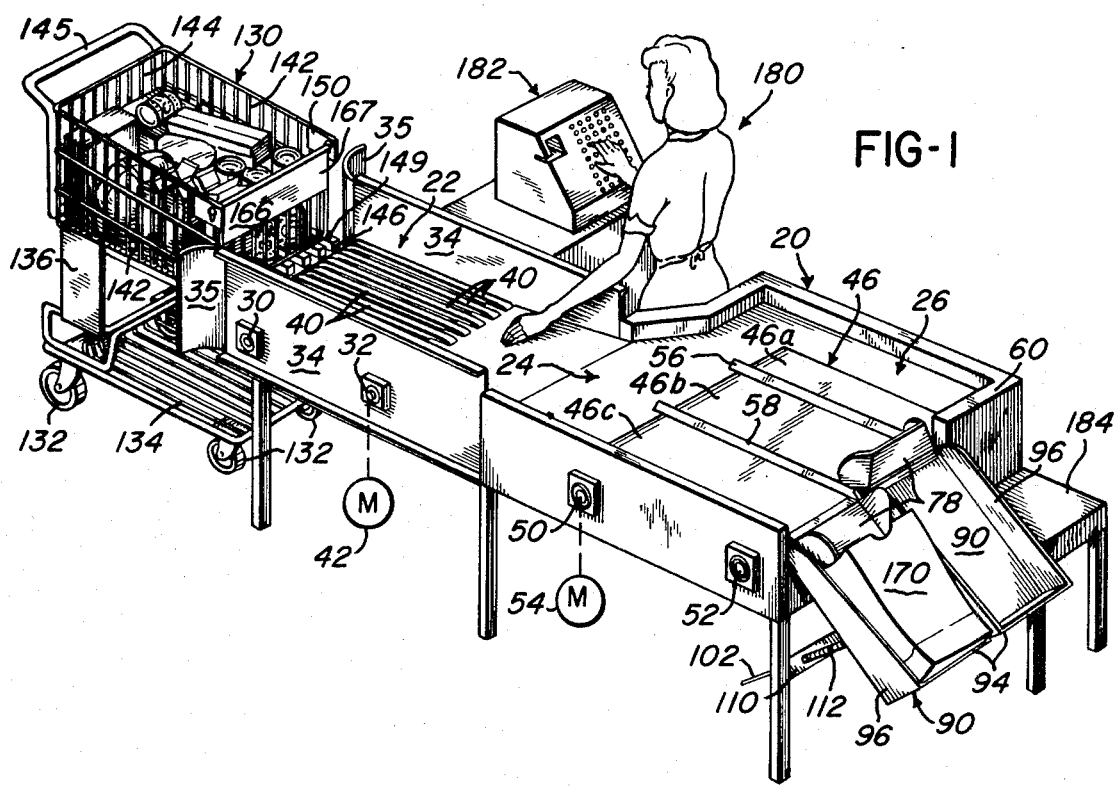
FIG-1
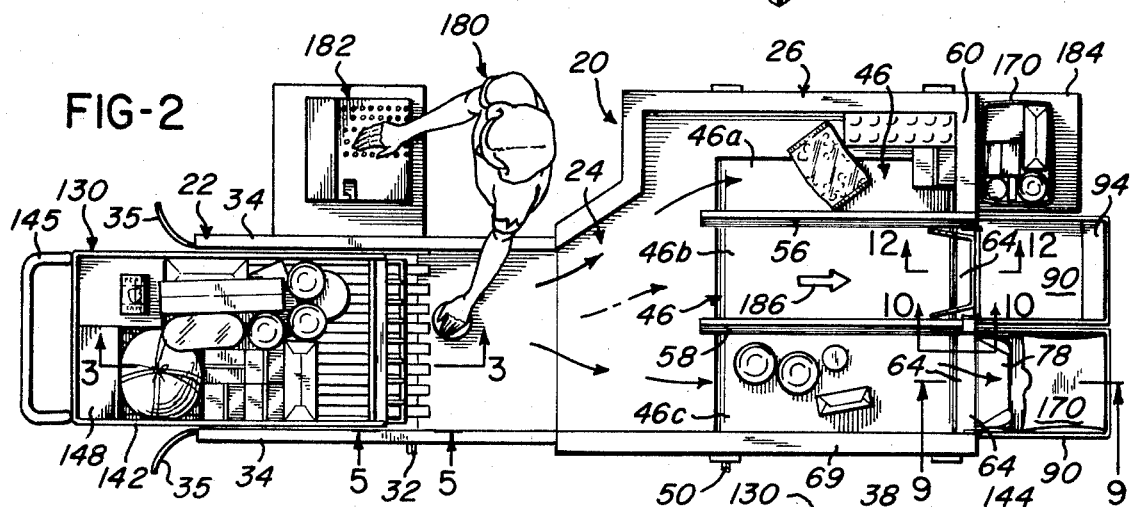
FIG-2
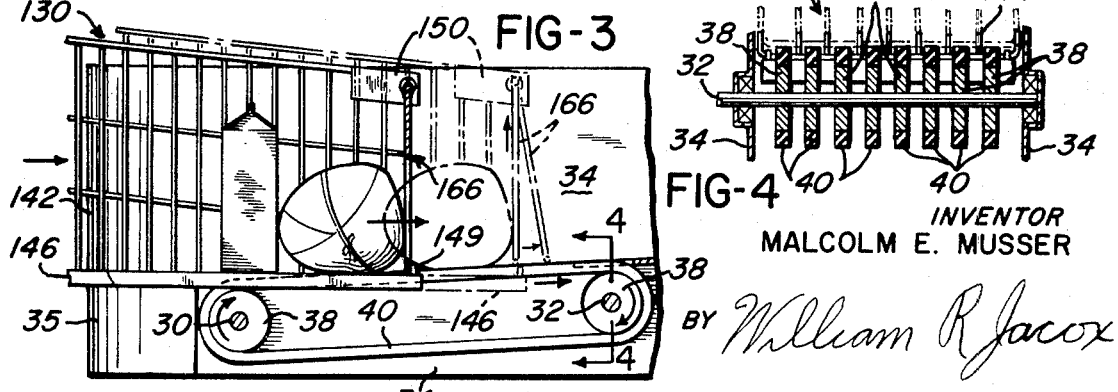
FIG-3
FIG-4
INVENTOR
MALCOLM E. MUSSER
BY William R Jacox
ATTORNEY Patented July 25, 1972
3,678,660
3 Sheets-Sheet 2
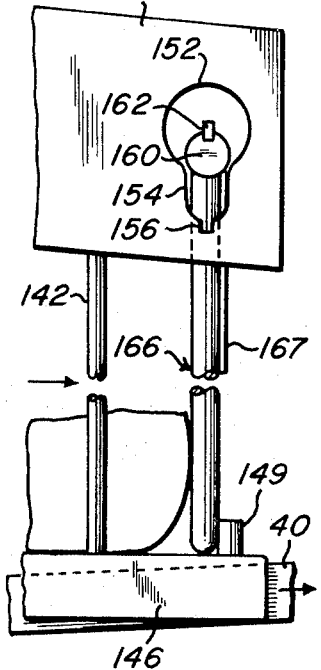
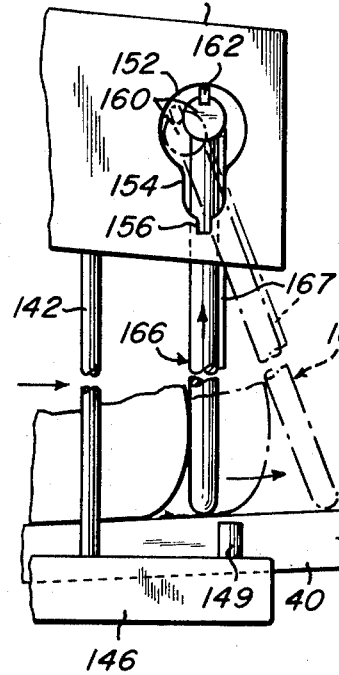
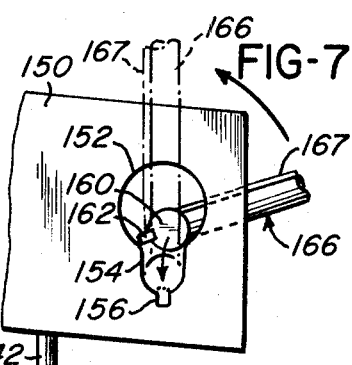
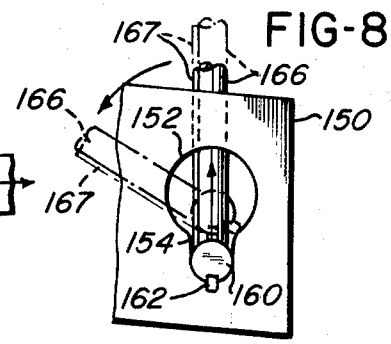
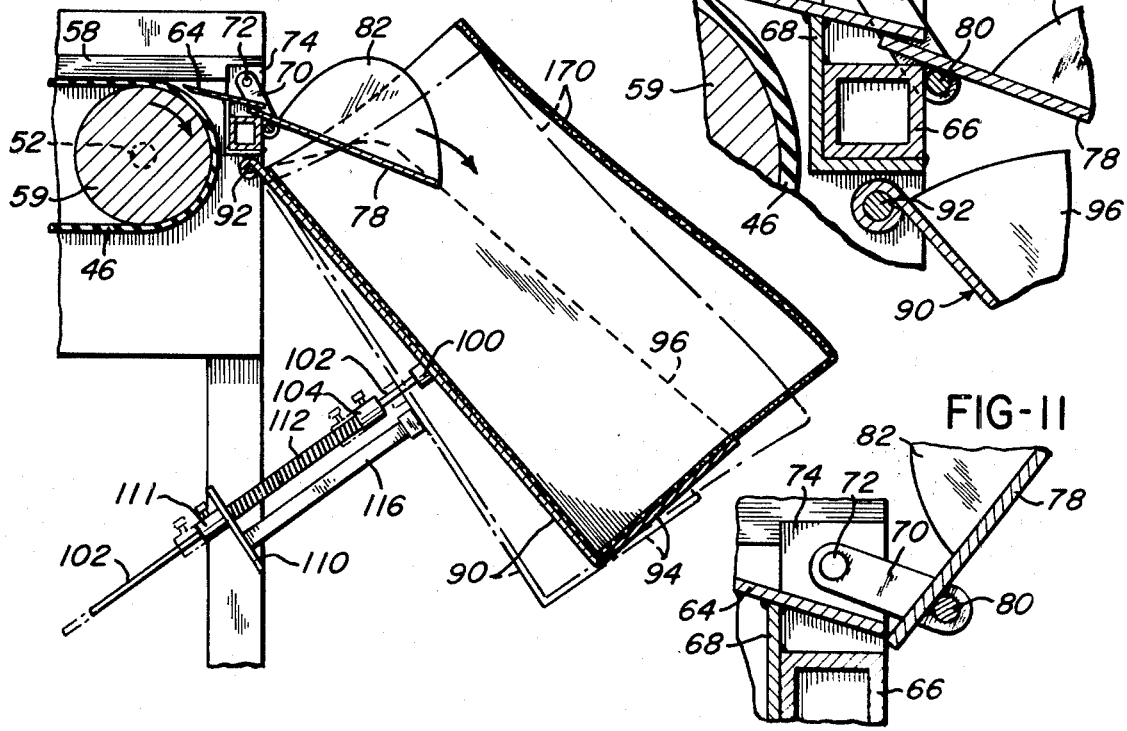
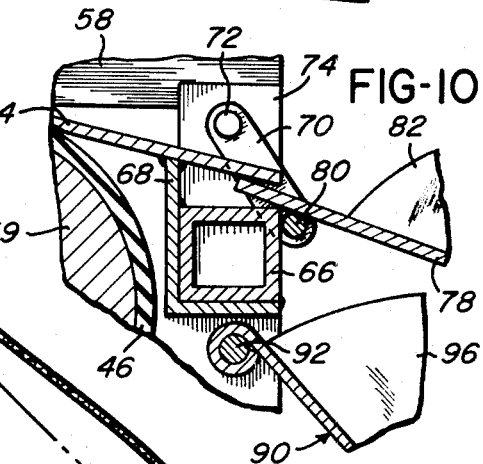
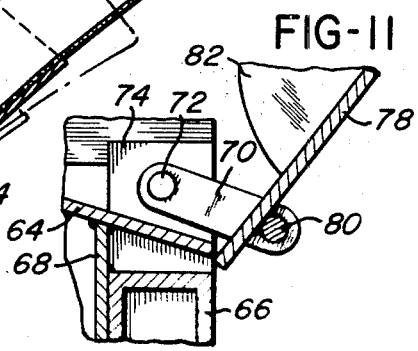

Patented July 25, 1972
3,678,660
3 Sheets-Sheet 3
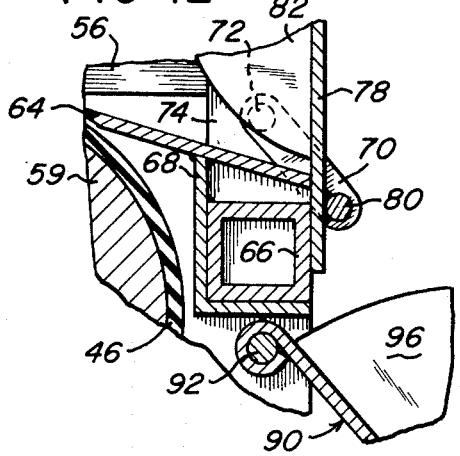
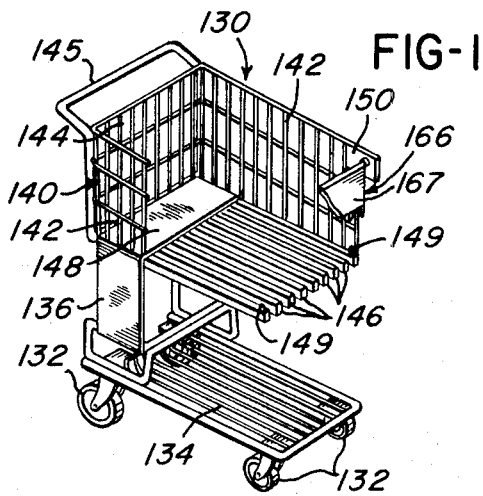
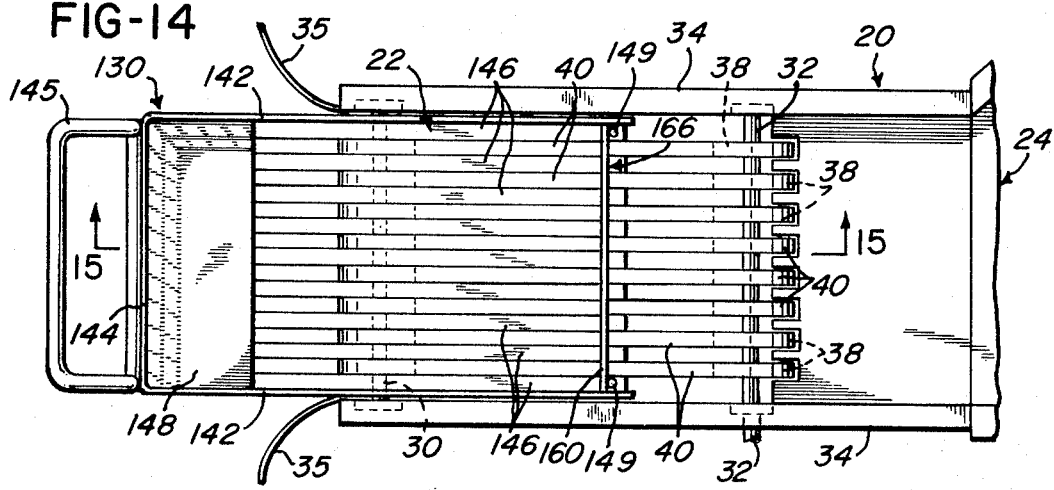
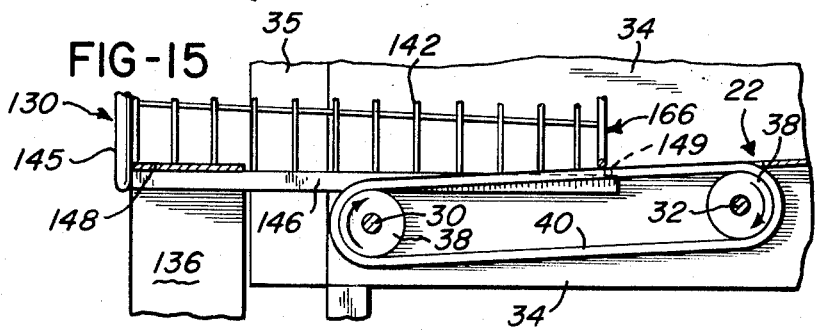
INVENTOR
MALCOLM E. MUSSER
BY William R. Jaco
ATTORNEY

UNLOAD, CHECK, AND BAG APPARATUS FOR SUPERMARKETS

BACKGROUND OF THE INVENTION

It is an object of this invention to provide apparatus which automatically moves articles of merchandise from a basket-cart or the like to the surface of a checkout counter.

Another object of this invention is to provide checkout counter apparatus by which articles of merchandise are readily separated into classified groups for the bagging thereof.

Another object of this invention is to provide apparatus which automatically moves articles of merchandise from a checkout counter to a bag or bags.

Another object of this invention is to provide a chute for conducting articles of merchandise from a checkout counter to a bag, which chute may also serve as a barrier to prevent movement of articles of merchandise from a checkout counter.

Another object of this invention is to provide apparatus by which one operator can rapidly and efficiently cause articles to move from a basket-cart to a bag or bags, while the operator checks and records the prices of the articles.

Another object of this invention is to provide means by which a gate of a basket-cart is automatically opened for removal of articles of merchandise from the basket-cart.

Another object of this invention is to provide bag holder apparatus which automatically changes angular position as the bag is filled. Thus, the first articles entering a bag slide down a portion of the internal wall of the bag and subsequent articles drop into the bag when the bag is more nearly filled. Thus, no article of merchandise falls an appreciable distance.

Other objects and advantages reside in the construction of parts, the combination thereof, the method of manufacture, and the mode of operation, as will become more apparent from the following description.

BRIEF DESCRIPTION OF THE DRAWINGS

FIG. 1 is a perspective view of apparatus of this invention.

FIG. 2 is a top plan view of the apparatus of FIG. 1, illustrating use thereof.

FIG. 3 is an enlarged sectional view, taken substantially on line 3—3 of FIG. 2.

FIG. 4 is a sectional view, taken substantially on line 4—4 of FIG. 3.

FIG. 5 is an enlarged fragmentary view taken substantially on line 5—5 of FIG. 2.

FIG. 6 is an enlarged fragmentary view similar to FIG. 5, showing the elements thereof in another position of operation.

FIG. 7 is a fragmentary view of a portion of the apparatus of FIGS. 5 and 6, illustrating other positions of operation of elements thereof.

FIG. 8 is a fragmentary view, similar to FIG. 7, illustrating other positions of operation of the elements thereof.

FIG. 9 is an enlarged sectional view, taken substantially on line 9—9 of FIG. 2.

FIG. 10 is an enlarged fragmentary sectional view taken substantially on line 10—10 of FIG. 2, FIG. 10 being drawn on a larger scale than FIG. 9.

FIG. 11 is an enlarged fragmentary sectional view, similar to FIG. 10, illustrating movement of elements shown.

FIG. 12 is an enlarged sectional view, drawn on substantially the same scale as FIG. 10 and taken substantially on line 12—12 of FIG. 2.

FIG. 13 is a perspective view, with parts broken away, drawn on substantially the same scale as FIG. 1, showing a basket-cart of the apparatus of this invention.

FIG. 14 is an enlarged top plan view of a basket-cart and a portion of a checkout counter of this invention, with the basket-cart partially intermeshed with the checkout counter.

FIG. 15 is a sectional view, taken substantially on line 15—15 of FIG. 14.

DETAILED DESCRIPTION OF THE PREFERRED EMBODIMENT

Apparatus of this invention includes a checkout counter 20 having a receiver portion 22, an intermediate portion 24, and a discharge portion 26.

The receiver portion 22 is provided with a pair of spaced-apart shafts 30 and 32, each of which extends between side portions 34 of the receiver portion 22. Each of the side portions 34 has an arcuate director member 35 attached thereto and extending therefrom. A plurality of spaced-apart wheels 38, best shown in FIG. 4, are attached to each of the shafts 30 and 32. Belts 40 encompass the wheels 38 of the shafts 30 and 32, as each belt 40 is supported by a wheel 38 of the shaft 30 and a wheel 38 of the shaft 32. It is to be understood, however, that annular members, other than the belts 40 may be used, for example, chains, wheels, and the like.

A motor 42 shown diagrammatically in FIG. 1, is operably joined, by any suitable means, to the shaft 32 for rotation thereof. Thus, the motor 42, when energized, causes rotation of the wheels 38 and the belts 40, as illustrated in FIG. 3.

The intermediate portion 24 of the checkout counter 20 is shown as being substantially flat, for sliding movement of articles from the receiver portion 22 to the discharge portion 26.

The discharge portion 26 of the checkout counter 20 includes a relatively wide conveyor belt 46 which is supported by spaced-apart shafts 50 and 52. FIG. 9 shows a roller 59 which is carried by the shaft 52 and which partially supports the conveyor belt 46. A motor 54, shown diagrammatically in FIG. 1, is operably connected by any suitable means, to the shaft 50 for rotation thereof and for rotative movement of the conveyor belt 46.

A plurality of partition members, herein shown as partition members 56 and 58, extend over the conveyor belt 46 and divide the conveyor belt 46 into a plurality of sections, herein shown as sections 46a, 46b, and 46c.

At the end of the discharge portion 26 and adjacent the section 46a of the conveyor belt 46 is a wall 60, shown in FIGS. 1 and 2. In substantial alignment with the wall 60 and disposed between the partitions 56 and 58 and between the partition 58 and a side wall 69 is an inclined shelf 64, shown in FIGS. 10 and 12, which is attached to a support bar 66 by means of a connector 68. The uppermost part of the inclined shelf 64 is closely adjacent the belt 46. An arm 70 is pivotally connected by means of a pin 72 to a fixed bracket 74 which is attached to the partitions 56 and 58. A plate 78 is secured to a rotatable stem 80 which is carried by the pivotal arms 70 and extends therebetween. The plate 78 has flanges 82 attached thereto at opposite portions thereof. Thus, a structure comprising the elements 64, 66, 68, 69, 70, 72, 74, 78, and 80 is disposed between the partitions 56 and 58 and another such structure is disposed between the partitions 58 and the side wall 69, at the ends thereof.

Below the support bar 66 and below each plate 78 is a support element or bag holder 90 which is pivotally carried by a pin 92. The support element 90 has a floor 94 and sides 96, secured thereto.

As best shown in FIG. 9, a pad 100 engages the support element 90. The pad 100 is attached to a rod 102 which has a collar 104 secured thereto. The rod 102 freely slidably extends through a bracket 110. A collar 111 is attached to the rod 102 below the bracket 110 and limits upward travel of the rod 102. A spring 112 encompasses the rod 102 and is disposed between the bracket 110 and the collar 104. Thus, the spring 112 resiliently urges the rod 102 and the support element 90 in a direction from the bracket 110. A rigid elongate abutment member 116 is also attached to the bracket 110 and extends therefrom toward the support element 90.

A basket-cart 130 cooperates with the checkout counter 20. The basket-cart 130 has wheels 132 which support a lower rack 134. Struts 136 connect the lower rack 134 to an upper rack 140, which has side members 142 and a back member 144. A handle 145 is shown attached to the upper rack 140.

The bottom of the rack 140 has a solid section 148. A plurality of spaced-apart bars 146 are attached to the solid section 148 and extend forwardly thereof. The forward end of at least one of the bars 146 has an upwardly extending protuberance 149, as shown in FIGS. 5 and 6. At the forward portion of the basket-cart 130 and attached to the side members 142 are holders 150, each of which is provided with a keyhole shaped opening 152 which has a narrow portion 154, which terminates in a generally rectangular slot 156.

A shaft 160 extends between the holders 150 and has the ends thereof within the openings 152. Each end of the shaft 160 has a lug 162. The shaft 160 has attached thereto a gate 166. FIG. 1 shows that the gate 166 may include a sheet portion 167. It is to be understood that the gate 166 may be of wire, or may be solid, or have openings, and may be of any suitable material. The lower part of the gate 166 normally rests upon the forward part of the bars 146 and engages the upwardly extending protuberances 149 of the bars 146, as shown in FIG. 5.

OPERATION

A customer places articles of merchandise within the basket-cart 130 and then moves the basket-cart 130 to the checkout counter 20 to have the articles "checked" by a checkout clerk 180 who uses a cash register 182 or the like. The checkout clerk 180 is positioned adjacent the intermediate portion 24 of the checkout counter 20 and may have control over the operation of the motor 42. The basket-cart 130 is moved to the receiver portion 22 of the checkout counter 20, and is received by the receiver portion 22 between the director members 35.

The spacing between the belts 40 is substantially equal to the thickness of the bars 146. Therefore, as the basket-cart 130 moves between the director members 35, the basket-cart 130 also moves between the side portions 34 of the receiver portion 22 of the checkout counter 20. The bars 146 become alternately positioned with the belts 40, as illustrated in FIGS. 4 and 14. Thus, the basket-cart 130 can be moved forwardly between the side portions 34 of the receiver portion 22 until the solid section 148 comes into contact with the belts 40.

As illustrated in FIGS. 3 and 15, the portions of the belts 40 between the wheels 38 are upwardly inclined. As the basket-cart 130 is moved forwardly between the side portions 34, the bars 146 move to intermeshed juxtaposition among the belts 40. The bars 146 become positioned at a lower level than a portion of the belts 40. Thus, the belts 40 lift the gate 166 from the position thereof shown in FIG. 5 to the position thereof shown in FIG. 6. As illustrated, the belts 40 lift the gate 166 from engagement with the bars 146, above the protuberances 149. Thus, as the upper portions of the belts 40 move forwardly, the lower part of the gate 166 is moved forwardly, as illustrated in FIG. 6.

As the gate 166 is lifted and angularly moved upwardly, the shaft 160, positioned within the openings 152, is permitted to freely move upwardly, as shown in FIG. 6. Due to the fact that when the bars 146 and the belts 40 are intermeshed the belts 40 are positioned at a higher elevation than the bars 146, articles of merchandise are lifted from the bars 146 by the belts 40. Therefore, after the belts 40 cause the bottom part of the gate 166 to move forwardly, the articles of merchandise are moved forwardly upon the belts 40 to the intermediate portion 24 of the checkout counter 20.

In order to permit the articles of merchandise to freely move forward to the intermediate portion 24, without interference by the gate 166, the checkout clerk 180 may lift the forward part of the gate 166 and rotatively move the gate 166 until the gate 166 is inverted and vertically disposed, as illustrated in FIG. 7. Thus, the shaft 160 is moved downwardly into the portion 154 of the opening 152 and the lug 162 moves into the slot 156 to retain the gate 166 in the inverted vertical position, as shown in solid lines in FIG. 8. Thus, the gate 166 remains in the inverted vertical position as articles of merchandise are moved forwardly upon the belts 40 from the bars 146, to the intermediate portion 24 of the checkout counter 20.

As each article of merchandise reaches the intermediate portion 24, the checkout clerk 180 manually engages the article with one hand and operates the cash register 182 with the other hand. The clerk 180 then manually moves the article of merchandise to one of the sections 46a, 46b, or 46c of the conveyor belt 46.

The motor 54 rotates the conveyor belt 46 so that the upper surface thereof moves away from the intermediate portion 24, as illustrated by an arrow 186 in FIG. 2.

If the article of merchandise is relatively heavy and/or sturdy, as, for example, a can or box of merchandise, the article is moved by the checkout clerk to the 46c section of the conveyor belt 46. The article is then moved by the conveyor belt 46 to the inclined floor 64.

A paper bag 170 or the like rests upon the support element or bag holder 90 and the floor 94. The flanges 82 of the plate 78 extend into the bag 170 and serve to keep the top of the bag 170 open. The flanges 82, with the plate 78, form a chute and serve to direct an article into the bag 170, as the article moves from the inclined shelf 64, to the plate 78. Thus, as illustrated in FIG. 2, each article moved by the checkout clerk 180 to the section 46c of the conveyor belt 46 is automatically moved by the belt 46 to the inclined shelf 64, from whence the article falls to the plate 78 and is directed into the bag 170.

Light and/or delicate or breakable articles of merchandise are moved by the checkout clerk 180 to the section 46a of the conveyor belt 46. The section 46a moves each article toward the wall 60. From such position the articles may be manually and individually placed into a bag 170 which may be positioned upon a shelf 184, shown in FIGS. 1 and 2.

FIGS. 1 and 2 show no bag 170 or the like supported by the bag holder 90 at the end of the section 46b. Thus, preferably, the plate 78 is pivotally positioned as shown in FIG. 12. The plate 78 thus serves as a barrier to prevent movement of articles from the inclined shelf 64 which is at the end of the section 46b. The plate 78 may be readily pivotally moved from the position thereof shown in FIG. 10 to the position thereof shown in FIG. 12. Such pivotal movement of the plate 78 is performed by pivotal movement of the arms 70 about the axis of the pin 72 and by pivotal movement of the plate 78 about the axis of the stem 80, as illustrated in FIG. 11.

Thus, it is understood that each plate 78 may be pivotally positioned as shown in FIG. 10 to form a chute or may be pivotally positioned as shown in FIG. 12 to form a barrier. When the plate 78 is in the position shown in FIG. 10, the flanges 82 thereof assist in maintaining the upper part of the bag 170 in an open position.

As articles of merchandise move into a bag 170 which is supported by a bag holder 90, the weight of the articles causes the bag holder 90 to pivotally move downwardly, as illustrated in FIG. 9. The pivotal position of the bag holder 90 is determined by the spring 112. As the weight of articles increases within the bag 170 supported by the bag holder 90, the spring 112 permits the rod 102 to move downwardly as the rod 102 is forced downwardly by the weight of articles within the bag 170. Such downward movement of the rod 102 is against the resiliency of the spring 112. Thus, the bag 170 automatically becomes more vertically disposed as greater weight is disposed therewithin.

Thus, it is understood that apparatus of this invention provides means by which articles of merchandise are automatically removed from a basket-cart. The articles are then manually moved by a checkout clerk to selected sections of a conveyor belt. An article moved to each conveyor belt section is moved by the conveyor belt to a bagging position. If the plate 78 at the end of the section is pivotally disposed as shown in FIG. 10, the article falls into a bag. If the plate 78 is pivotally disposed as shown in FIG. 12, the article is prevented from movement from the checkout counter 20.

After all of the articles of merchandise within the basket-cart 130 have been moved therefrom, the checkout clerk 180 lifts the gate 166 from the vertical inverted position thereof shown in FIG. 8 and permits the gate 166 to rotatively move into the basket-cart as illustrated in FIG. 8, to again become positioned against the protuberances 149 and the bars 146.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. In combination, stationary support structure for articles and movable support structure for articles,
    the stationary support structure having a receiver portion which includes a plurality of elongate annular flexible rotatable members, the elongate annular flexible rotatable members being substantially parallel and in spaced-apart relationship, each of the elongate annular flexible rotatable members having a given width dimension,
    the movable article support structure including a plurality of spaced-apart elongate rigid members which are adapted to support articles, the elongate rigid members being in substantially parallel relationship, the elongate rigid members being spaced apart a distance at least equal to the width dimension of the annular flexible rotatable members, each of the elongate rigid members having a width dimension less than the spacing between adjacent elongate annular flexible rotatable members so that the movable support structure can be moved to a position in which the elongate rigid members are alternately disposed between adjacent elongate annular flexible rotatable members and substantially parallel therewith,
    the elongate annular flexible rotatable members having portions at a higher elevation than the elongate rigid members so that as the elongate flexible annular members rotatively move, articles supported by the rigid members are moved therefrom by the elongate flexible members,
    stationary article support structure having a discharge portion,
    conveyor belt means rotatively supported at the discharge portion,
    a bag holder positioned adjacent the conveyor belt means so that an article falls from the conveyor belt means into a bag supported by the bag holder.

2. In combination, stationary support structure for articles and movable support structure for articles,
    the stationary support structure having a receiver portion which includes a plurality of elongate annular flexible rotatable members, the elongate annular flexible rotatable members being substantially parallel and in spaced-apart relationship, each of the elongate annular flexible rotatable members having a given width dimension,
    the movable article support structure including a plurality of spaced-apart elongate rigid members which are adapted to support articles, the elongate rigid members being in substantially parallel relationship, the elongate rigid members being spaced apart a distance at least equal to the width dimension of the annular flexible rotatable members, each of the elongate rigid members having a width dimension less than the spacing between adjacent elongate annular flexible rotatable members so that the movable support structure can be moved to a position in which the elongate rigid members are alternately disposed between adjacent elongate annular flexible rotatable members and substantially parallel therewith,
    the elongate annular flexible rotatable members having portions at a higher elevation than the elongate rigid members so that as the elongate flexible annular members rotatively move, articles supported by the rigid members are moved therefrom by the elongate flexible members,
    the stationary support structure having a discharge portion,
    a chute carried by the discharge portion of the stationary support structure so that articles move from the stationary support structure to the chute,
    a bag holder positioned adjacent the chute to support a bag so that articles move from the chute into a bag supported by the bag holder.

3. The combination of claim 2 in which the bag holder is pivotally supported by the discharge portion of the stationary support structure.

4. The combination of claim 3 which includes resilient bias means engaging each bag holder and determining the pivotal position thereof, so that the bag holder pivotally moves as the weight of articles carried by a bag supported thereby increases.

5. The combination of claim 1 in which the chute is pivotally movable to an inclined position between the discharge portion of the stationary support structure and the bag holder to direct articles from the stationary support structure into a bag supported by the bag holder, the chute also being pivotally movable to a generally upward position with respect to the discharge portion of the stationary support structure to prevent movement of articles from the stationary support structure.

6. The combination of claim 1 in which the chute includes a pair of side flanges over which a part of a bag may be disposed to maintain the bag in an open condition as the bag is supported by the bag holder.

7. A checkout counter comprising: support structure,
    a conveyor belt rotatably carried by the support structure,
    a plurality of partition members carried by the support structure and disposed above the conveyor belt in relatively close relationship thereto, the partition members being in spaced-apart relationship, the partition members thus dividing the conveyor belt into sections.
    a plurality of bag holders, there being a bag holder pivotally carried by the support structure at the end of each section of the conveyor belt, the bag holder being adapted to support a bag as articles move from the conveyor belt into a bag supported by the bag holder, means determining the pivotal position of the bag holder in accordance with the weight and position of articles within a bag supported by the bag holder.

8. The checkout counter of claim 7 which includes a chute pivotally carried by the support structure between the conveyor belt and the bag holder, the chute being pivotally movable from a downwardly extending position to direct articles in movement from the conveyor belt to a bag supported by the bag holder, the chute being pivotally movable to an upwardly extending position to prevent articles from moving from the conveyor belt.

9. The checkout counter of claim 8 in which the chute has side flanges which are movable into a bag supported by the bag holder, the flanges serving to hold the bag open and to direct articles thereinto.

10. Bagging apparatus for articles comprising:
    support structure,
    conveyor belt means having a discharge portion,
    bag holder means for holding a foldable paper-like bag, the bag holder means being pivotally attached to the support structure adjacent the discharge portion of the conveyor belt means and supporting a bag for receipt of articles moving from the discharge portion of the conveyor belt means,
    means resiliently biasing the bag holder means and determining the pivotal position thereof so that the bag holder means pivotally moves as the weight of articles within a bag supported by the bag holder means changes.

11. Bagging apparatus for articles comprising: support structure,
    conveyor belt means having a discharge portion,
    bag holder means for holding a foldable paper-like bag, the bag holder means being attached to the support structure adjacent the discharge portion of the conveyor belt means and supporting a bag for receipt of articles moving from the discharge portion of the conveyor belt means, a chute pivotally attached to the support structure adjacent the discharge portion of the conveyor belt means, the chute being pivotally movable to a downwardly inclined position toward the bag holder means to direct articles in movement from the discharge portion of the conveyor belt means into a bag which is supported by the bag holder means, the chute also being pivotally movable to a generally upward abutment position to prevent movement of articles from moving from discharge portion of the conveyor belt means. from the 12. The apparatus of claim 11 which includes a shelf rigidly supported by the support structure adjacent the discharge portion of the conveyor belt means and inclined downwardly from the discharge portion of the conveyor belt means toward the bag holder means, an arm pivotally attaching the chute to the support structure, the chute including a portion movable to a position generally aligned with the shelf when the chute is in a downwardly inclined position, said portion of the chute being movable to a generally vertical position adjacent the lower end of the shelf when the chute is in an abutment position.

* * * * *